3,360,541
MANUFACTURE OF ADIPONITRILE
Walter John Korchinsky, Lafayette, Ind., and Joseph Sikora, St. Hilaire, Quebec, and John Murray Earls Hill, St. Lambert, Quebec, Canada, assignors, by mesne assignments, to E. I. du Pont de Nemours and Company, Wilmington, Del., a corporation of Delaware
No Drawing. Filed Apr. 13, 1965, Ser. No. 447,874
Claims priority, application Canada, May 5, 1964, 902,100
9 Claims. (Cl. 260—465.2)

ABSTRACT OF THE DISCLOSURE

A process for the production of adiponitrile from adipic acid and ammonia which results in an easier separation of the condensed product into an adiponitrile containing oil phase and an adiponitrile precursor containing aqueous phase by adjusting the pH of the condensate of the dehydration reaction to from 7.0 to 10.00 and in an increase in yield due to a method of converting the adiponitrile precursors from the aqueous phase into adiponitrile by removing water from the adiponitrile precursor in the aqueous phase prior to a second dehydration reaction.

---

The present invention relates to an improved process for the manufacture of adiponitrile from adipic acid and ammonia.

One of the more important uses of adiponitrile lies in the preparation of hexamethylene diamine which is a useful intermediate in the preparation of nylon.

It is known that adiponitrile may be prepared by the catalytic dehydration of adipic acid/ammonia mixtures. One such process is disclosed in U.S. Patent 2,200,734 in which a mixture of ammonia, in molecular excess, and adipic acid is passed over a compound of boron and phosphorus, acting as a dehydration catalyst, at a temperature between 300 and 550° C.

The catalytic dehydration of mixtures of adipic acid and ammonia to yield adiponitrile may be regarded as one involving the successive elimination of four molecules of water from ammonium adipate according to the following scheme:

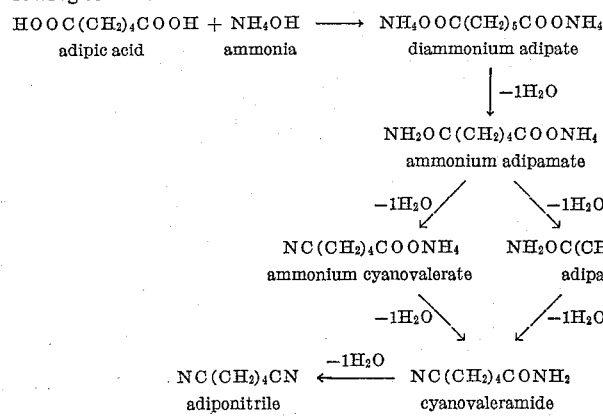

Thus, adiponitrile may be considered as the final product of the catalytic dehydration of diammonium adipate.

The involved nature of the catalytic dehydration reaction of mixtures of adipic acid and ammonia to yield adiponitrile results in a contaminated reaction product. Amongst the contaminants are diammonium adipate, ammonium adipamate, adipamide, ammonium delta-cyanovalerate and delta-cyanovaleramide. These products are noteworthy since each may itself be used as a starting material in the manufacture of adiponitrile and will be referred to hereinafter as "adiponitrile precursors." The relative proportions of these products within the contaminated reaction product may vary with any particular catalyst used and with actual reaction conditions employed. In general, the cyanovaleramide and ammonium cyanovalerate are found in higher proportions than the adipamide, ammonium adipamate and diammonium adipate. Adiponitrile precursors containing carboxylic acid groups or being salts thereof will be referred to hereinafter as "acidic precursors"; adipamide and cyanovaleramide will be referred to hereinafter as "neutral precursors."

Adiponitrile and water are only partially miscible at room temperature; for example, adiponitrile saturated with water contains about 7 to 8% of water. Because of this partial solubility the catalytic dehydration reaction product of adipic acid and ammonia forms two layers upon cooling. In one layer adiponitrile is the main component and this gives the layer an oily appearance. This layer will hereinafter be sometimes referred appearance. This layer will hereinafter be sometimes referred to as the "oil layer." The other layer, containing water as the main component, will hereinafter be sometimes referred to as the "aqueous layer."

It has now been found that adiponitrile acidic precursors partition predominantly into the aqueous layer and that the partition of the neutral precursors between the oil and aqueous layers is relatively independent of the pH of the aqueous layer. It has also now been found that, because of the high solubility in the aqueous layer of the ammonium salts of the acidic precursors, the partition of all the acidic precursors into the aqueous layer may be improved considerably by making the medium alkaline, preferably with a volatile base such as ammonia. This method of separating adiponitrile precursors from the bulk of adiponitrile obtained by the catalytic dehydration of diammonium adipate is an improvement over the conventional technique involving distillation since the precursors and particularly the acidic ones, tend to decompose under the conditions of prolonged heating at high temperatures prevailing in such distillation processes.

It is an object of the present invention to separate an enriched stream of adiponitrile precursors from the contaminated reaction product obtained by the catalytic dehydration of diammonium adipate.

A further object of the present invention is to provide a method for the conversion of neutral and acidic precursors obtained in said catalytic dehydration reaction to adiponitrile in yields economically attractive.

Yet a further object of the present invention is to provide a process for the manufacture of adiponitrile which increases the economic efficiency of the conversion of adipic acid to adiponitrile in the catalytic dehydration of a mixture of adipic acid and ammonia.

In its broadest aspect, the present invention provides a process for the manufacture of adiponirtile which comprises the steps of adjusting the pH of the aqueous component of crude adiponitrile product obtainable by the dehydration of adipic acid in the presence of ammonia to from 7.0 to 10.0 at 25° C.; separating the aqueous component and removing water therefrom; contacting the residue so obtained with a dehydration catalyst in the presence of ammonia and recovering adiponitrile from the product.

In particular, the present invention provides a process for the manufacture of adiponitrile which comprises the steps of contacting a mixture of ammonia, in molecular excess, and adipic acid with a dehydration catalyst at a temperature between 300° and 500° C.; condensing the product so obtained; expelling ammonia from the condensate; adjusting the pH of the condensate to from 7.0 to 10.0 at 25° C.; allowing the alkaline condensate to settle into an aqueous layer and an oil layer; separating the aqueous layer from the oil layer at a temperature between 10° and 75° C.; removing water from the aqueous layer; contacting the residue from the aqueous layer with a dehydration catalyst in the presence of ammonia and recovering adiponitrile from the product so obtained and from the oil layer.

When the dehydration is carried out by a vapour phase process, the preferred dehydration catalyst in both instances is boron phosphate. Phosphoric acid is recommended as the dehydration catalyst when the dehydration of the reisdue from the aqueous layer is carried out in the liquid phase. Boron phosphate, unlike other well-known dehydration catalysts such as the oxides of aluminum or silicon, appears to promote better the reaction leading to the formation of adiponitrile, thus reducing losses to contaminants, and maintains a high degree of activity for a longer time partly owing to the slower rate at which its surface becomes covered with carbon deposits.

The amount of alkali added to the condensate prior to its separation into an aqueous layer and an oil layer is preferably that required to give a pH in the aqueous layer of between 8.0 and 9.5. This pH may conveniently be attained by the addition of a concentrated aqueous solution of ammonia; strong volatile amine-type organic alkalies may be used as an alternative.

Whilst the actual separation of the aqueous layer from the oil layer may be carried out at any temperature between 10° and 75° C., it is preferred that this separation be carried out at a temperature between 20° and 60° C.

In practising the present invention water will not normally be removed from the product of the initial catalytic dehydrating reaction giving rise to the condensate prior to the latter's separation into the aqueous layer and the oil layer. However, it is possible to recover adiponitrile precursors from the condensate even if water has been partially removed therefrom prior to its separation into the aqueous layer and the oil layer.

If desired, the oil layer may be washed with water or dilute ammonia in order to recover additional quantities of adiponitrile precursors and the extract may be added to the aqueous layer.

Water may be removed from the aqueous layer under reduced pressure or under atmospheric pressure. In this removal of water it is advisable to maintain the temperature below 200° C. and in any case not above 220° C. Above the latter temperature acid precursors tend to decompose.

According to the process of the present invention adiponitrile in the aqueous layer need not be separated from adiponitrile precursors. It is, of course, possible to practise the present invention even if adiponitrile has been extracted from the aqueous layer with a solvent having specific affinity for adiponitrile such as trichloroethylene or tetrachloroethane.

After water has been removed from the aqueous layer the residue may be converted directly to adiponitrile, in the presence of ammonia, with the aid of a dehydration catalyst or it may first be blended with adipic acid or cyanovaleramide and other neutral precursors recovered from the oil layer, prior to its conversion to adiponitrile.

It is generally preferred to use adipic acid and ammonia as starting materials in the preparation of adiponitrile. Hence, the present invention has been described with reference only to these two starting materials. However, it will be understood that certain derivatives of adipic acid, such as adipamide, adipimide, esters of adipic acid, adipamic acid and cyanovaleric acid or amide, obtainable as contaminants in the catalytic dehydration of mixtures of adipic acid and ammonia may also be used as starting materials in place of adipic acid and, for the purposes of the present invention, will be considered equivalent to adipic acid. Depending upon the physical properties of these derivatives of adipic acid they may be reacted with ammonia as powdered solids, liquids, gases or in solution or suspension in suitable solvents.

The process of the present invention is preferably practised at atmospheric pressure although there is no disadvantage in operating at higher or lower pressures than atmospheric in order to increase the capacity of a given reaction vessel or to facilitate vaporization of high boiling reactants.

The following examples serve to illustrate, but do not limit the scope of the present invention as set forth in the claims hereto. All parts are parts by weight.

*Example 1*

A stream of ammonia was passed over boron phosphate catalyst having a particle size of from 8 to 14 mesh and being maintained at a temperature of 330° to 380°, the main part of the catalyst being at 360° to 375° C. Adipic acid vapour was passed with the ammonia at a uniform rate, the molecular ratio of ammonia to adipic acid being 8 to 1, and the time of contact being approximately 5 seconds. In traversing the catalyst, the vapor mixture was dehydrated to yield a vaporous product rich in adiponitrile and water. 1000 grams of this product were condensed and boiled for 30 minutes to displace ammonia. 12.5 grams of concentrated ammonia solution were then added. After agitating at room temperature, the resultant concentrate was allowed to settle into two layers; namely, an oil layer and an aqueous layer. The oil layer weighed 618 grams and the aqueous 404 grams. The pH of the aqueous layer was 9.0 at 25° C.; this temperature, as referred to in the claims, is a reference temperature only not the temperature at which the pH adjustment is made.

Upon analysis the wet oil layer was found to contain 550 grams of adiponitrile, 46 grams of water, 2.2 grams of acid precursors and 16 grams of cyanovaleramide. This wet oil layer was dried by distillation under reduced pressure and was then fractionally distilled at a pressure of 5 mm. Hg abs. yielding first an adiponitrile fraction and then an intermediate fraction rich in cyanovaleramide; a tar residue of about 4.9 grams was left.

The aqueous layer was dehydrated by distillation under a pressure of 100 mm. Hg abs. until the temperature of the residue reached 150° C. The residue weighed 65 grams and was found to contain 28.3 grams of adiponitrile, 11.6 grams of cyanovaleramide, 23 grams of organic acids, 1.1 grams of adipamide and 0.6 gram of water.

The residue from the aqueous layer was then combined with the intermediate fraction obtained in the fractionation of the oil layer and filtered to yield a combined product which upon analysis had the following composition: adiponitrile 34.5 grams, cyanovaleramide 34.5 grams, acidic precursors 29.8 grams, water 1 gram. This product was vaporized in approximately equal weight of heated ammonia and was passed through a one inch glass tube four feet long containing granular boron phosphate catalyst at 340 to 360° C. After removal of ammonia the resultant reaction product weighed 98.5 grams and contained 83 grams of adiponitrile, 2.95 grams of cyanovaleramide, 0.9 gram of acid precursors and 12.9 grams of water. The difference between the adiponitrile content of the product and that of the starting material shows that 88.4% of the adiponitrile available theoretically from the precursors in the starting material was obtained. Conversion of precursors to adiponitrile in this manner represents an increase in the overall yield of adiponitrile from adipic acid from the usual conventional level of 85% to 91% of that attainable theoretically.

Example 2

A further portion of the original condensate obtained by catalytically dehydrating the mixture of adipic acid and ammonia according to Example 1 was heated at atmospheric pressure to 96 to 98° C. for 15 minutes in order to reduce the ammonia content of the condensate. The resultant condensate was cooled and then allowed to separate into two layers at a temperature between 46 and 50° C. The pH of the aqueous layer was 9.5 at 25° C. After separation of the two layers the wet oil layer was found to have the following composition: adiponitrile 85 parts, cyanovaleramide 3 parts, acidic precursors 0.25 part, water 7.5 parts, 2-cyanocyclopentylideneimine 0.46 part.

The oil layer was washed with ⅓ of its volume of distilled water. After so washing the oil layer, its composition was found to be: adiponitrile 85.9 parts, cyanovaleramide 2.5 parts, acids 0.015 part, 2-cyanocyclopentylideneimine 0.46 part.

The aqueous layer was dehydrated by distillation at atmospheric pressure until the temperature of the residue reached 150° C. The composition of the residue was found to be as follows: adiponitrile 22 parts, delta-cyanovaleramide 21.4 parts, acidic precursors 49.5 parts, 2-cyanocyclopentylideneimine 0.02 part, water 2.6 parts. The residue was then passed through a tube packed with granulated boron phosphate catalyst in the manner described in Example 1. The resultant product, after water and ammonia had been removed had the following composition: adiponitrile 82.5 parts, delta-cyanovaleramide 1.2 parts, acidic precursors 0.4 part, 2-cyanocyclopentylideneimine 0.65 part, carbon dioxide 0.53 part. The difference between the adiponitrile content of the product and that of the starting material shows that 86.3% of the adiponitrile available theoretically from the precursors in the starting material was obtained.

Example 3

Water was removed from an aqueous layer obtained according to the procedure set out in Example 2 above by distillation at atmospheric pressure until the temperature of the residue was 180° C. 3 parts of adipic acid (M.P. 152° C.) were then added to the residue and the resultant mixture was passed over a boron phosphate catalyst bed in the manner described in Example 1. 94.1% of adiponitrile expected for a quantitative yield were found in the reaction product.

Example 4

An aqueous layer obtained according to the procedure set forth in Example 2 above was dehydrated at reduced pressure at 100° C. to give a residue which contained 57 parts adiponitrile, 12 parts delta-cyanovaleramide, 3 parts adipamide, 24 parts of delta-cyanovaleric acid and adipamic acid, and 4 parts water. Anhydrous ammonia was then bubbled through a mixture of 277 grams of this residue and 2 ml. (3.4 grams) of 85% phosphoric acid under constant agitation at 275° C. until water ceased to distill over. The adiponitrile content of the 233 grams of reaction products obtained, was 82.3% which corresponds to a yield of 38.4% based upon the adiponitrile theoretically available from the precursors in the starting material.

Example 5

1,100 grams of a dehydrated aqueous layer obtained according to the procedure set out in Example 2 and containing 57.8 parts of adiponitrile, 14.3 parts cyanovaleramide, and 20.7 parts adipamic acid and cyanovaleric acid, were treated in the presence of 8 grams of 85% phosphoric acid with 238 gm./hr. of ammonia for ten hours at a temperature of 270° C. After evolution of water had ceased the reaction product weighed 975 grams and contained 87.8 parts adiponitrile and 3.0 parts cyanovaleramide. The increase in adiponitrile content of the product relative to that of the starting material represened a 71% yield of adiponitrile based upon the precursor content of the starting material.

Example 6

A dehydrated aqueous layer prepared according to the procedure outlined in Example 2 and containing 53.6 parts of adiponitrile, 17.5 parts of cyanovaleramide, 18.7 parts of cyanovaleric acid and 15 parts of adipamide was charged to a 2-liter glass reaction vessel equipped with heating mantle, agitator, gas inlet tube and a product condensing system consisting of a short packed vertical column followed by a steam condenser and then a cold water condenser. Phosphoric acid (0.5 wt. percent based on the reactor charge) was added, the whole was agitated, ammonia was sparged into the liquid at a rate of 0.18 lb./hr./lb. of reactor contents and the reaction temperature was raised to 270° C. When organic liquid was observed to reflux in the steam condenser, draw-off of crude adiponitrile was begun below the steam condenser. Excess of ammonia and water of reaction passed through the steam condenser and were collected at the cold water condenser. Fresh starting material was added at frequent intervals to the reactor to maintain the reaction mixture at a relatively constant level. The run was terminated after 5,795 gm. of starting material had been processed through the reactor, the total elapsed time of the run being approximately 15 hours. The product collected from the steam condenser amounted to 3,885 gm. and contained 94.5 parts of adiponitrile and 1.78 parts of cyanovaleramide. The residue in the reactor weighed 1,229 gm. and contained 66.8 parts of adiponitrile and 7.27 parts of cyanovaleramide. The adiponitrile content of the product and the reactor residue represents an 84.7% yield of the adiponitrile theoretically available in the precursor portion of the starting material.

As many apparently widely different embodiments of this invention may be made without departing from the spirit and scope thereof, it is to be understood that this invention is not limited to the specific embodiments thereof except as defined in the appended claims.

What is claimed is:

1. A process for the manufacture of adiponitrile which comprises the steps of adjusting the pH of the aqueous component of crude adiponitrile product obtained by the dehydration of adipic acid in the presence of ammonia under vapor phase adiponitrile precursor dehydrating conditions to from 7.0 to 10.0 at 25° C.; separating the aqueous components and removing the water therefrom; contacting the residue from the aqueous layer with a dehydration catalyst in the presence of ammonia under liquid phase adiponitrile precursor dehydration conditions and recovering adiponitrile from the product.

2. A process for the manufacture of adiponitrile which comprises the steps of contacting a mixture of ammonia, in molecular excess, and adipic acid with a dehydration catalyst at a temperature between 300° C. and 500° C.; condensing the product so obtained; expelling ammonia from the condensate; adjusting the pH of the condensate to from 7.0 to 10.0 at 25° C.; allowing the alkaline condensate to settle into an aqueous layer and an oil layer, separating the aqueous layer from the oil layer at a temperature between 10° and 75° C.; removing water from the aqueous layer; contacting the residue from the aqueous layer with a dehydration catalyst in the presence of ammonia under liquid phase adiponitrile precursor dehydration conditions and recovering adiponitrile from the product so obtained and from the oil layer.

3. A process according to claim 2 in which the liquid phase reaction to convert the residue from the aqueous layer to adiponitrile is carried out at 275° C. in the presence of excess ammonia.

4. A process acocrding to claim 2 in which the mixture of ammonia and adipic acid is passed over boron phosphate and the residue from the aqueous layer is brought into contact with a dehydration catalyst selected from the class consisting of boron phosphate and phosphoric acid.

5. A process according to claim 2 in which the pH of the condensate is adjusted to between 8.0 and 9.5.

6. A process according to claim 2 in which the pH if the condensate is adjusted by means of ammonia.

7. A process according to claim 2 in which the aqueous layer is separated from the oil layer at a temperature between 20° and 60° C.

8. A process according to claim 2 in which adiponitrile precursors are recovered from the oil layer by fractional distillation and are combined with the residue from the aqueous layer prior to passing the latter over a dehydration catalyst.

9. In a process for the manufacture of adiponitrile comprising the steps of contacting a mixture of ammonia, in molar excess, and adipic acid with a dehydration catalyst under vapor phase dehydration conditions to form adiponitrile and adiponitrile precursors, condensing the product so obtained, separating the aqueous layer from the oil layer and contacting the adiponitrile precursor containing aqueous layer with a dehydration catalyst in the presence of ammonia under liquid phase dehydration conditions to form adiponitrile, the improvements comprising adjusting the pH of the product recovered in the condensing step to from 7.0 to 10.0 at 25° C. and removing water from the aqueous layer separated in the separating step and contacting the residue from the aqueous layer with the dehydration catalyst in the presence of ammonia under liquid phase dehydration conditions to form adiponitrile.

References Cited

UNITED STATES PATENTS

| | | | |
|---|---|---|---|
| 2,132,849 | 10/1938 | Greenewalt et al. | 260—465.2 |
| 2,144,340 | 1/1939 | Lazier | 260—465.2 |
| 2,273,633 | 2/1942 | Fluchaire et al. | 260—465.2 |

JOSEPH P. BRUST, *Primary Examiner.*